US006168222B1

(12) United States Patent
Lacy, III

(10) Patent No.: US 6,168,222 B1
(45) Date of Patent: Jan. 2, 2001

(54) SHIPPING METHOD FOR EXTRUDED SHAPES

(75) Inventor: Curtis R. Lacy, III, Buford, GA (US)

(73) Assignee: Stephen Gould Paper Co., Inc.

( * ) Notice: Under 35 U.S.C. 154(b), the term of this patent shall be extended for 0 days.

(21) Appl. No.: 09/080,132

(22) Filed: May 15, 1998

(51) Int. Cl.[7] .......... B66C 1/12; B66C 1/18; B65D 71/00; B65G 1/14

(52) U.S. Cl. .......... 294/74; 53/399; 53/444; 206/597; 206/599; 220/636

(58) Field of Search .......... 294/74, 77, 67.4, 294/68.3, 81.55, 81.56; 108/51.11, 52.1, 56.3; 53/399, 444; 206/386, 597, 599; 220/636

(56) References Cited

U.S. PATENT DOCUMENTS

| | | | | |
|---|---|---|---|---|
| 1,632,952 | * | 6/1927 | Daughs | 294/74 |
| 2,792,252 | * | 5/1957 | Ernst | 294/74 |
| 2,793,904 | * | 5/1957 | Gale | 294/74 |
| 3,203,726 | * | 8/1965 | Smith | 294/74 |
| 3,331,496 | * | 7/1967 | Marsden et al. | 206/597 |
| 3,430,585 | * | 3/1969 | Grant et al. | 108/51 |
| 3,456,976 | | 7/1969 | Husmann | 294/74 |
| 3,524,543 | | 8/1970 | Bundy et al. | 206/65 |
| 3,680,494 | * | 8/1972 | Glasi | 108/51 |
| 3,743,341 | | 7/1973 | Gale | 294/74 |
| 3,858,526 | * | 1/1975 | Lombard et al. | 108/51 |
| 3,942,654 | * | 3/1976 | Warrick | 206/599 |
| 3,986,611 | * | 10/1976 | Dreher | 206/597 |
| 4,045,071 | | 8/1977 | Dunstan | 294/67 R |
| 4,828,110 | * | 5/1989 | Lems | 206/427 |
| 4,878,334 | * | 11/1989 | Quinn | 53/399 |
| 5,216,871 | * | 6/1993 | Hannen | 53/556 |
| 5,307,928 | * | 5/1994 | Bishop | 206/320 |
| 5,607,237 | * | 3/1997 | LaFleur | 383/22 |
| 5,975,301 | * | 11/1999 | Stall et al. | 53/444 |
| 6,047,523 | * | 4/2000 | Eyre et al. | 206/597 |

FOREIGN PATENT DOCUMENTS

| | | | | |
|---|---|---|---|---|
| 0009862 | * | 1/1979 | (JP) | 294/67.4 |
| 210668 | * | 1/1967 | (SE) | 294/74 |

* cited by examiner

*Primary Examiner*—Dean J. Kramer
*Assistant Examiner*—Paul T. Chin
(74) *Attorney, Agent, or Firm*—Kenneth S. Watkins, Jr.

(57) ABSTRACT

A method and apparatus for shipping a bundle containing elongated articles comprises a stretch film wrapping a plurality of elongated articles and at least one lift strap. Looped ends of the lift straps are routed though holes cut in the stretch film. An overhead crane lifts the bundle with or without a spreader bar. Support blocks, attached by adhesive strips to the bottom of the bundle, support the bundle above the load surface to allow insertion of a lift device such as a lift fork below the bundle. Edge protectors may be used with the lift straps at the edges of the bundle.

15 Claims, 4 Drawing Sheets

SHIPPING METHOD FOR EXTRUDED SHAPES

BACKGROUND OF THE INVENTION

The present invention relates to packaging and shipping methods for elongated articles and, more particularly, to packaging and shipping methods for profile extrusions.

Various methods for packaging, handling and shipping of bundled articles have been introduced for consumer, commercial and industrial products. These methods are generally suited for shipping boxes, crates, containers or pallets containing articles for shipment. When shipping groups of articles where packaging in rigid protective containers is not feasible or too expensive, special methods must be used. This is especially the case for articles which may have special shapes, such as elongated shapes, or for items easily bent, scratched, or otherwise damaged.

U.S. Pat. No. 3,456,976 discloses a load lift assembly for a group of articles utilizing straps to secure a bundle. Edge protectors protect the edges of the articles being lifted. Lifting methods such as this are not effective in bundling elongated articles such as profile extrusions which are subject to scratching. Articles bundled by this method are difficult to pick up by other means, such as with a fork lift truck, without damage.

U.S. Pat. No. 4,045,071 discloses a system for transporting and storing long extrusions. The system uses a pair of U-shaped frames for stacking the extrusions. A strap across the top of the extrusions secures the extrusions in the frames. A separate lift assembly lifts the bundle. The system requires special equipment and heavy assemblies to carry out its intended function.

OBJECTS AND SUMMARY OF THE INVENTION

Therefore and object of the present invention is to provide a shipping, handling and storage method for elongated articles such as extruded shapes and profiles.

A further object of the present invention is to provide a shipping, handling and storage method which provides protection over the full length of the articles.

A further object of the present invention is to provide a shipping, handling and storage method which provides a means to bundle elongated articles with non-rectangular cross sections.

A further object of the present invention is to provide a shipping, handling and storage method which provides a means to easily lift a bundle of elongated articles from below.

A further object of the present invention is to provide a shipping, handling and storage method which does not require special shipping equipment.

A further object of the present invention is to provide a shipping, handling and storage method which provides protection for the bundled articles from vibration damage.

Yet another object of the present invention is to provide a shipping, handling and storage method which is simple and inexpensive.

The method of the present invention comprises the steps of bundling elongated articles such as profile extrusions in a bundle having a generally flat top and a flat bottom. The bundle is wrapped by at least one, and preferably two lift straps spaced longitudinally along the bundle. The bundle comprising the elongated articles and lift straps is secured by wrapping with stretch film or other securing means.

To lift the bundle, an operator cuts the stretch film in the vicinity of end loops of the lift straps, allowing an overhead lift mechanism such as a spreader bar to lift the bundle. Upon lifting, support blocks comprising adhesive on one side of the block are attached to the bottom of the bundle. The support blocks provide a means to easily lift the bundle from the bottom, for example with a fork lift truck, as well as from above the bundle utilizing the lift straps. Additionally, the support blocks provide protection from vibration damage during transportation and distribute loads from stacked bundles.

The stretch film provides scratch protection for the entire length of the elongated articles, and provides a means to securely bundle elongated articles with a non-rectangular cross section such as circular, oval, or other shaped articles. In the preferred embodiment, the operator places edge protectors on the lift straps at the bottom longitudinal edges of the bundle before securing the bundle with stretch film.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

The following is a description of the preferred embodiments of a method for lifting and supporting a bundle of extruded shapes.

Figure 1:
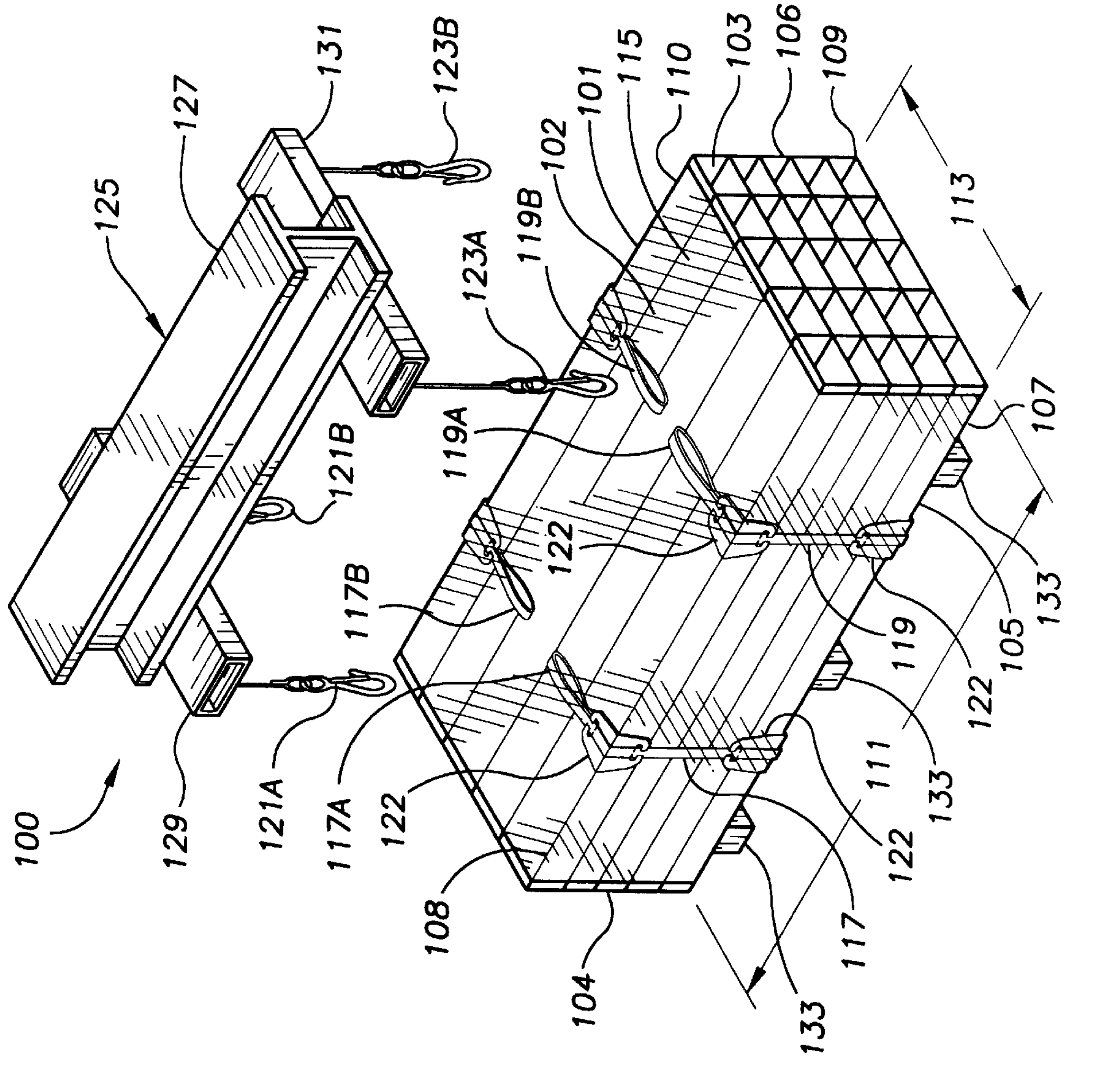
FIG. 1 is a perspective drawing of embodiment 100 of the shipping method for elongated articles showing a bundle of elongated articles and two lift straps secured and wrapped by stretch film, a two axis spreader beam used for lifting the bundle from above utilizing the end loops of the lift straps, and adhesive backed support blocks attached to the bottom of the bundle.

FIG. 1 is a perspective drawing of embodiment 100 of the apparatus used to lift and support a bundle 101 of elongated articles 103 which may be susceptible to scratching, denting, or other handling damage. In the preferred embodiment, articles 103 are extruded shapes such as chair and table legs, decorative moldings, and structural shapes, but in other embodiments, the elongated articles may be machined or fabricated. In the preferred embodiment, articles 103 are parallelepipeds, although other solid shapes having circular, trapezoidal, triangular or other shape cross sections may be bundled.

Bundle 101 is formed by a plurality of articles 103 arranged in a geometric shape, with top surface 102 and bottom surface 105 generally flat and parallel to each other, allowing multiple bundles to be stacked for storage and shipping. In the preferred embodiment bundle 101 is a parallelepiped. Bundle 101 comprises two lower longitudinal edges 107 and 109 extending longitudinally from end 104 to end 106. In the preferred embodiment, bundle length 111, defining the longitudinal direction, is greater than the bundle width 113, defining the transverse direction.

The integrity of the bundle is maintained by a bundle securing wrap such as a strap or web material which wraps the bundle. In the preferred embodiment, the bundle securing wrap is a stretch film 115 wrapped around bundle 101. Other bundle securing webs may be used such as heat shrink films, adhesive or cohesive films, or straps made of a woven or non-woven fiber, plastic or elastomeric material. Other films may be wrapped around the bundle and secured by adhesive strips, for example. Still another embodiment utilizes fiber webs such as Kraft paper as the securing wrap.

In order to create the bundle, an operator arranges articles 103 to form bundle 101. This may be done on a load platform or in a jig or fixture (not shown) to provide the desired bundle shape. In the preferred embodiment, lift straps 117 and 119 containing edge protectors 122 are placed on the load platform or in the jig or fixture before placing articles 103 to form the bundle. Upon completion of article 103 placement, the bundle securing wrap such as stretch film 115 is wrapped to secure the bundle. Lift straps 117 and 119 are secured inside of stretch film 115. In this way, bundles 101 may be stored with lift straps secured in the bundle, ready for use when needed. Alternatively, lift straps 117 and 119 are placed around bundle 101 after the bundle securing wrap is installed. Stretch film 115 provides protection for the entire length of the elongated articles from scratching or abrasion. Stretch film 115 also provides a tight, compressive securing force to the outside of the bundle, allowing irregular cross section shapes to be tightly secured in the bundle. In other embodiments, heat shrink film is wrapped around the bundle of articles and heat applied to secure the bundle.

When lifting bundle 101 by lift straps 117 and 119, the operator cuts stretch film 115 at lift strap end loop 117A, 117B, 119A, and 119B positions to expose the lift strap end loops and provide access for attaching to lift mechanism 125. The operator attaches end loop 117A to hook 121A of lift mechanism 125 and end loop 117B to lift mechanism hook 121B. In a similar manner, the operator attaches end loop 119A to hook 123A of lift mechanism 125 and end loop 119B to lift mechanism hook 123B. Edge protectors 122 are used at lower longitudinal edges 107 and 109, and, optionally, at upper longitudinal edges 108 and 110.

In the preferred embodiment, lift mechanism 125 comprises a longitudinal beam 127 and two transverse beams 129 and 131. Hooks 121A and 121B are spaced transversely by transverse beam 129, and hooks 123A and 123B are spaced transversely by beam 131, providing rotational stability of bundle 101 about a longitudinal axis of the bundle. Hooks 123A and 123B are spaced longitudinally from hooks 121A and 121B along beam 127 by the longitudinal displacement of beams 129 and 131, providing rotational stability about a transverse axis of the bundle. Lift straps 117 and 119 are spaced longitudinally from each other by an amount approximately equal to the longitudinal displacement of beams 129 and 131.

Once bundle 101 is lifted by lift mechanism 125, the operator places and secures adhesive support blocks 133 to bottom 105 of bundle 101. Blocks 133 provide support for bundle 101 when resting on a load surface (not shown) to protect articles 103 from scratching or abrasion from the load surface. Blocks 133 also provide a space between bottom 105 of bundle 101 and the load surface to allow lift devices such as the load fork of a lift truck to be inserted under the bundle for lifting from bottom 105. Blocks 133 provide support, abrasion protection and access space for bundles stacked on top of each other. Vibration dampening characteristics of blocks 133 provide protection from shipping damage during transportation.

Figure 2:
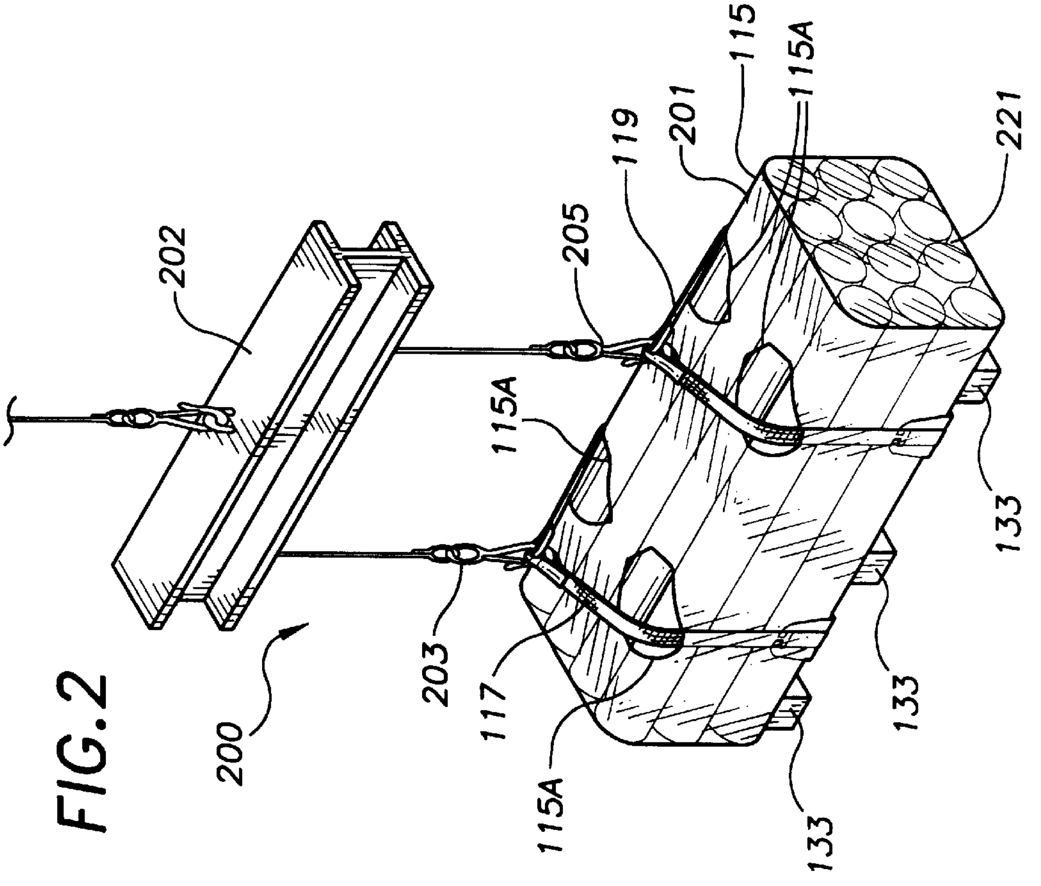
FIG. 2 is a perspective drawing of alternative embodiment 200 of the shipping method, showing a bundle of elongated articles of circular cross section lifted by a single axis spreader bar, the stretch film wrapping the articles and the lift straps cut away to expose the lift strap end loops.

FIG. 2 is a perspective drawing of alternative embodiment 200 of the shipping method showing bundle 201 lifted by a single axis lift mechanism or spreader bar 202. Bundle 201 is enclosed by stretch film 115. The loops of lift straps 117 and 119 are routed through stretch film 115 at cutouts 115A. Cutouts 115A may be formed by cutting openings at loops, for example, 117A, 117B, 119A and 119B of FIG. 1. A cutting instrument such as a knife or scissors may be used to make cutouts 115A. Hooks 203 and 205 act as longitudinally distributed attachment points for the loops of lift straps 117 and 119. Blocks 133 are attached to stretch film 115 on bundle bottom 221.

Figure 3:
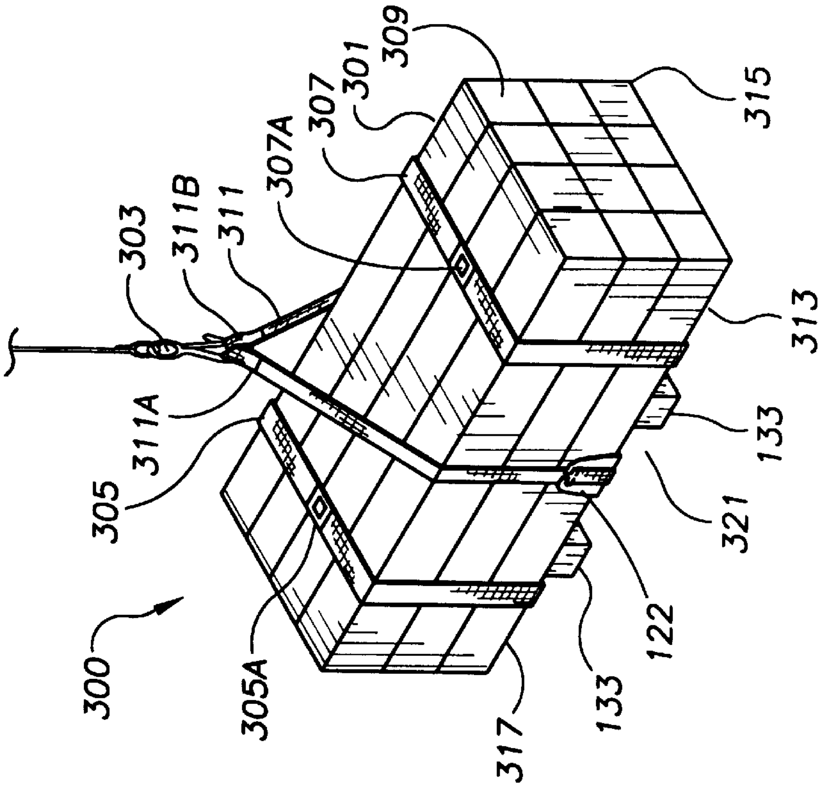
FIG. 3 is a perspective drawing of alternative embodiment 300 of the shipping method showing a bundle secured by straps lifted by a single lift hook and lift strap, and adhesive blocks attached to the bottom of the bundle to lift the bottom above a load surface for access of a fork lift assembly.

FIG. 3 is a perspective drawing of embodiment 300 of the shipping method, showing single crane hook 303 lifting bundle 301. Elastic straps 305 and 307 secure elongated articles 309 into bundle 301. Elastic straps 305 and 307 may be continuous bands or, they may comprise fasteners 305A and 307A, which may be hook and loop fasteners, snap fasteners, or other fasteners known in the art. Lift strap 311 comprises loops 311A and 311B to attach to hook 303. Edge protectors 122 are placed on lower longitudinal edges 313 and 315. Support blocks 133, comprising a pressure sensitive adhesive strips are attached directly to the articles 309 on the bottom 317 of the bundle, since no film wrapping is used in this embodiment. This embodiment does not provide the protective features of the stretch film, but still provides a means for the operator to lift the bundle with a lift device from above the bundle or, alternatively, by insertion of a lift device at the bottom of the bundle in the space 321 between the bundle bottom 317 and a support surface (not shown) created by blocks 133.

Figure 4:
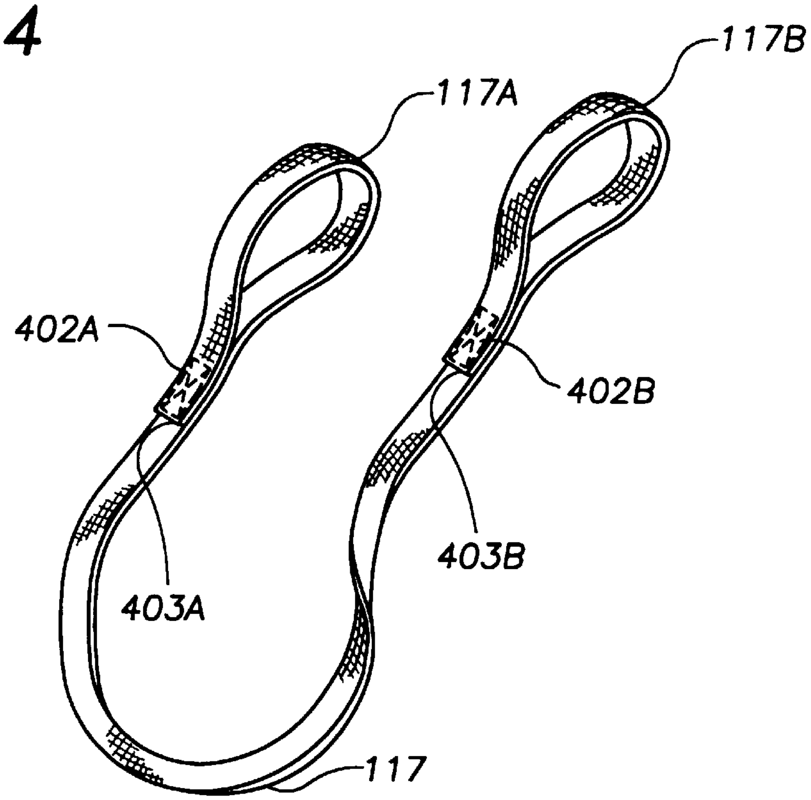
FIG. 4 is a perspective drawing of a lift strap with end loops for lifting a bundle from above the bundle.

FIG. 4 is a perspective drawing of lift strap 117 used to lift a bundle of elongated articles (not shown). Strap 117 may be made of natural or synthetic materials such as jute, polyester. polyamide, natural and synthetic elastomers, and other polymers or wire. In the preferred embodiment, strap 117 is made of polyester webbing. Stitches 402A and 402B attaches ends 403A and 403B of strap 117 to itself to form end loops 117A and 117B.

Figure 5A:
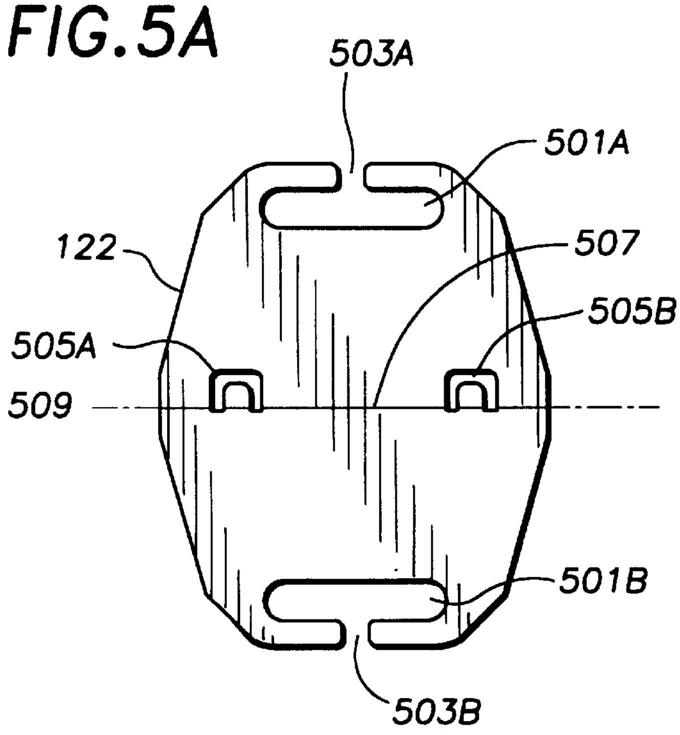
FIG. 5A is a front elevation drawing of a edge protector which is inserted onto the webbing of a lift strap for spreading the lift forces at the edge of the bundle.

FIG. 5A Is a front elevation view of edge protector 122. The purpose of edge protector 122 is to distribute the load of lift straps at the edges of the bundle over a area larger than the strap itself to reduce bending or damage to articles in the bundle of FIGS. 1–3. Strap retaining apertures 501A and 501B retain a strap on the outside of the edge protector as shown in FIG. 1. Access slots 503A and 503B provide an opening to insert an edge of the strap to install the edge protectors on the strap. Additional apertures 505A and 505B and score 507 provide a means to fold protector on fold line 509.

Figure 5B:
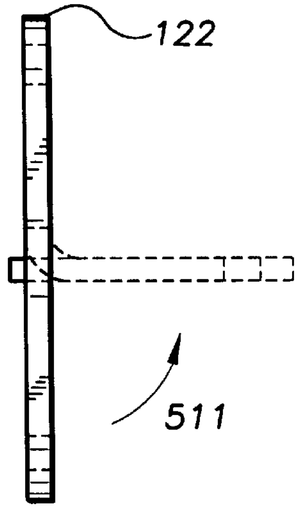
FIG. 5B is a side elevation drawing of the edge protector of FIG. 5A, showing the edge protector in the folded position with phantom lines.

FIG. 5B is a side view of edge protector 122. Arrow 511 shows the direction of fold and the phantom lines show protector 122 in the folded position. Edge protector 122 may be made of sturdy sheet material such as plastic, metal or laminates. In the preferred embodiment, protector 122 is made of a material softer than the articles in the bundle of FIG. 1.

Figure 6B:
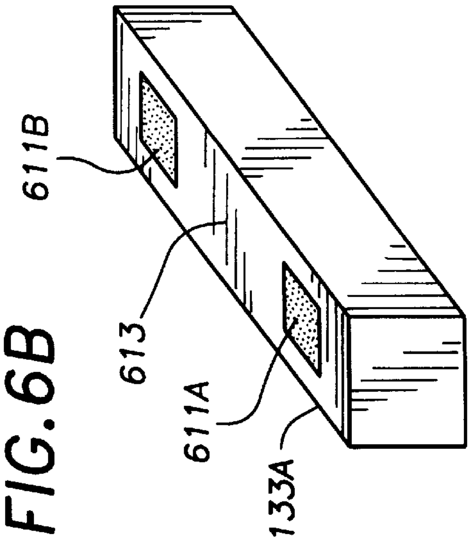
FIG. 6B is a perspective drawing of another embodiment of the support block comprising a plurality of adhesive strips on one surface of the block.
Figure 6C:
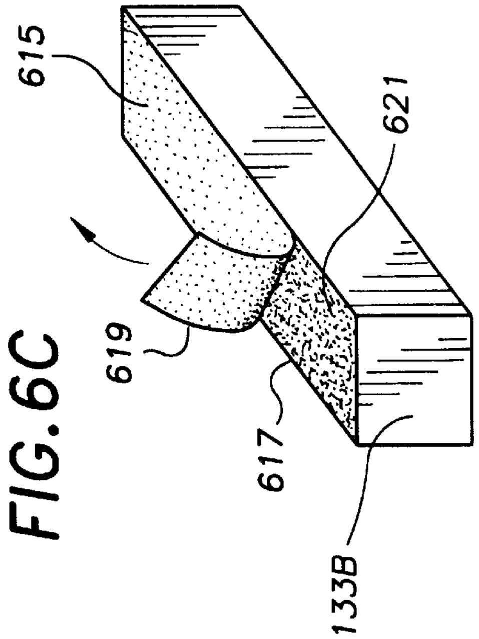
FIG. 6C is a perspective drawing of a support block comprising an adhesive strip attached to one of the surfaces of the block.
Figure 6A:
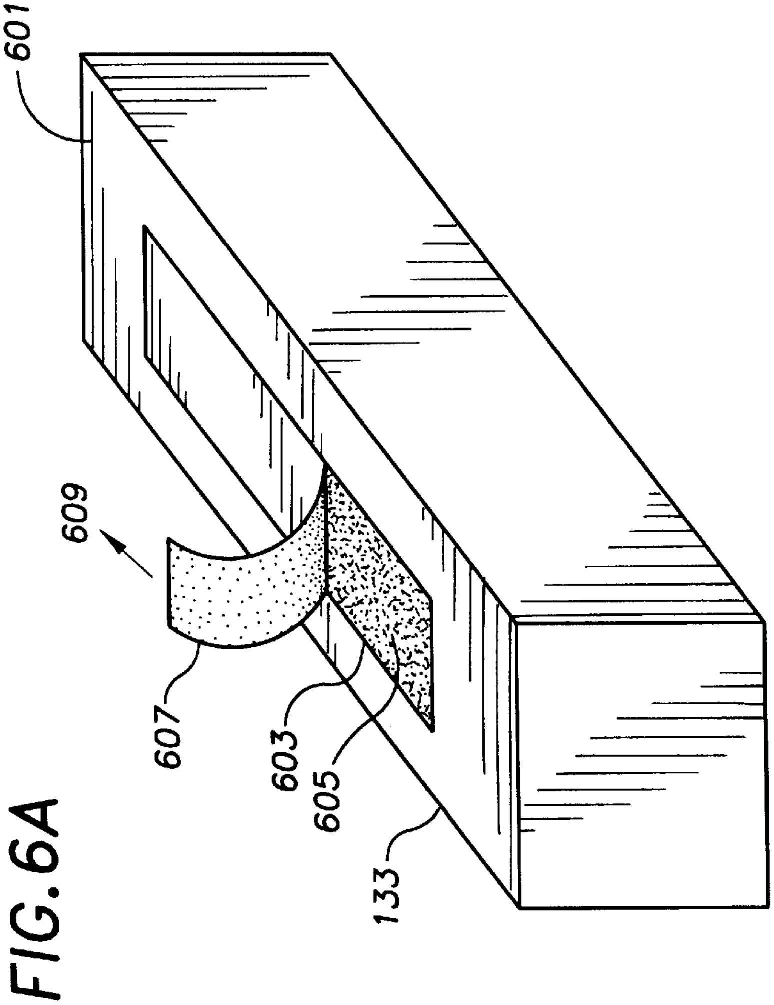
FIG. 6A is a perspective drawing of a support block for the bundle of FIG. 1 comprising an adhesive strip attached to one surface of the block, the adhesive strip comprising a peel strip for covering the adhesive strip when not in use.

FIG. 6A is a perspective drawing of support block 133 of FIG. 1. In the preferred embodiment, support block 133 is made of a rigid foam material such as expanded polystyrene or expanded polypropylene. Other materials such as wood or solid plastic may be used. In the preferred embodiment, one surface 601 comprises a pressure sensitive adhesive strip 603 attached to part or all of surface 601. Adhesive strip 603 may be a double sided adhesive strip. Upper surface 605 of adhesive strip 603 comprises a pressure sensitive adhesive for adhering to the bottom of the bundle of FIG. 1. In the preferred embodiment, a peel strip 607, covering surface 605 when not in use, may be removed by peeling in the direction of arrow 609.

FIG. 6B shows embodiment 133A of the support block showing multiple double sided adhesive strips 611A and 611B on surface 613. FIG. 6C shows embodiment 133B of the support block with the entire longitudinal surface 615 covered by adhesive strip 617. Peel strip 619 covers adhesive surface 621 before use. In other embodiments, other adhesives such as hot melt adhesives may be applied to one of the block surfaces before applying to the bottom surface of the bundle.

Support blocks 133 of FIG. 1 may extend transversely across bottom 105 completely or partially, or, they may extend longitudinally across bottom 105. In the preferred embodiment, at least two support blocks are used to support bundle 101 of FIG. 1 on a load surface. In more preferred embodiments, three or more blocks 133 are used to support bundle 101 of FIG. 1. Alternatively, single large blocks, or those having crossing or shaped members such as "I", "H" or "O" shaped blocks may adequately support the bundle.

Accordingly the reader will see that the SHIPPING METHOD FOR ELONGATED ARTICLES provides a method for securing, storing and loading a bundle of elongated articles. The method provides the following additional advantages:

The method allows lifting a bundle from above the bundle by an overhead lift device such as a crane and spreader bar, or from the bottom of the bundle by a lift device such as a lift fork inserted in a space created between the bottom of the bundle and the load surface;

Elongated articles of a variety of cross sectional shapes may be secured in the bundle;

The stretch film provides protection for the full length of the articles;

The support blocks provide protection from vibration and shipping damage during transport; and The method utilizes simple, low cost materials.

Although the description above contains many specifications, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. A method for shipping elongated articles, the method comprising the steps of:

securing a plurality of the elongated articles with a film wrapped around a substantial length of said plurality of elongated articles to define a bundle comprising a generally flat bottom surface;

wrapping at least one lift strap around the bundle;

lifting the bundle; and securing an adhesive backed support block to the film on the bottom surface of the bundle.

2. The method of claim 1 wherein the articles are profile extrusions.

3. The method of claim 1 wherein the film used to secure the bundle is a stretch film.

4. The method of claim 1 wherein two lift straps are used to lift the bundle, a first lift strap wrapped around the bundle in a first longitudinal position of the bundle and a second lift strap wrapped around the bundle in a second longitudinal position, said first lift strap and said second lift strap each comprising a first edge protector disposed at a first bottom longitudinal edge and a second edge protector disposed at a second bottom longitudinal edge.

5. The method of claim 1 wherein a first lift strap and a second lift strap are used to lift the bundle, the first lift strap and the second strap each comprising a first end loop and a second end loop, the first end loop of the first strap attached to a first lift point of a lift mechanism and a second end loop of the first strap attached to a second lift point of the lift mechanism, the first lift point and the second lift point of the lift mechanism separated by a distance transverse to the elongated articles, and the first end loop of the second strap attached to a third lift point of a lift mechanism and a second end loop of the second strap attached to a fourth lift point of the lift mechanism, the third lift point and the fourth lift point of the lift mechanism separated by a distance transverse to the elongated articles, and wherein the first and second lift points of the lift mechanism are separated by a distance longitudinal to the elongated articles from the third lift point and the fourth lift point of the lift mechanism.

6. The method of claim 1 wherein said at least one lift strap is wrapped around the bundle before the bundle is secured with the film enclosing the bundle and said at least one lift strap.

7. The method of claim 1 wherein two lift straps are wrapped around the bundle, a first lift strap wrapped around the bundle in a first longitudinal position of the bundle and a second lift strap wrapped around the bundle in a second longitudinal position, and wherein said film is a stretch film wrapped around the substantial length of the bundle and the first lift strap and the second lift strap, securing the first lift strap and the second lift strap inside the stretch film.

8. The method of claim 4 wherein the first lift strap is attached to a first lift point on a lifting mechanism, and the second lift strap is attached to a second lift point on the lift mechanism, the first lift point and the second lift point separated longitudinally.

9. The method of claim 7 wherein the first lift strap and the second lift strap are routed through openings in the stretch film before lifting the bundle with the lift straps.

10. The method of claim 9 wherein the openings are cut with a sharp tool.

11. A bundle for shipping elongated articles comprising:

at least one lift strap wrapped circumferentially about a plurality of the elongated articles, said at least one lift strap comprising an attachment point for an overhead lift mechanism; and a stretch film wrapped around a substantial length of said plurality of elongated articles, the stretch film enclosing and securing said plurality of elongated articles and said at least one lift strap.

12. The bundle of claim 11 comprising at least one support block attached to a bottom portion of the bundle by an adhesive.

13. The bundle of claim 12 wherein the adhesive comprises at least one adhesive strip attached to said at least one support block.

14. The bundle of claim 12 wherein the bottom portion of the bundle is substantially flat and said at least one support block is attached to an outside surface of the stretch film.

15. The bundle of claim 14 wherein said at least one lift strap comprises a first edge protector disposed at a first longitudinal edge and a second edge protector disposed at a second longitudinal edge.

* * * * *